US012682256B2

(12) United States Patent
Zhang et al.

(10) Patent No.:  US 12,682,256 B2
(45) Date of Patent:      Jul. 14, 2026

(54) SEMANTIC CONSISTENCY MODEL FOR DETERMINING A SEMANTIC CONSISTENCY OF CONTENTS OF AT LEAST TWO SCREENSHOTS

(71) Applicant: International Business Machines Corporation, Armonk, NY (US)

(72) Inventors: Yuan Jie Zhang, Ningbo (CN); Yi Chen Huang, Taipei (TW); Huai Ying Hy Xia, Beijing (CN); Dong Chen, Beijing (CN); Bo Zhang, Ningbo (CN); Tony Ping-Chung Yang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 18/107,943

(22) Filed: Feb. 9, 2023

(65) Prior Publication Data

US 2024/0273381 A1      Aug. 15, 2024

(51) Int. Cl.
*G06N 5/022* (2023.01)
*G06N 3/08* (2023.01)
(Continued)

(52) U.S. Cl.
CPC ............. *G06N 5/022* (2013.01); *G06V 10/50* (2022.01); *G06V 30/153* (2022.01);
(Continued)

(58) Field of Classification Search
CPC .......... G06N 5/022; G06N 3/08; G06N 20/00; G06V 10/50; G06V 30/153; G06V 30/164;
(Continued)

(56) References Cited

U.S. PATENT DOCUMENTS 6,917,952 B1 *   7/2005   Dailey ................. G06F 40/216
                                                             707/E17.084
7,580,960 B2     8/2009   Travieso et al.
(Continued)

FOREIGN PATENT DOCUMENTS

CN      108182145 A       6/2018
WO      2016043729 A1     3/2016
WO      2018169573 A1     9/2018

OTHER PUBLICATIONS

Gao et al., NPL ("Video Captioning With Attention-Based LSTM and Semantic Consistency" Published Sep. 2017 [11 pages] by IEEE (Year: 2017).*
(Continued)

*Primary Examiner* — Quoc A Tran
(74) *Attorney, Agent, or Firm* — Stosch Sabo

(57)      ABSTRACT

A computer-implemented method, according to one embodiment, includes using a trained semantic consistency model to determine a semantic consistency of contents of two screenshots. The trained semantic consistency model bases the semantic consistency on dimensions including: a linguistic comparison of the contents, an image comparison of the contents and a text location comparison of the contents. The method further includes outputting the determined semantic consistency for display on a user device. A computer program product, according to another embodiment, includes a computer readable storage medium having program instructions embodied therewith. The program instructions are readable and/or executable by a computer to cause the computer to perform the foregoing method. A system, according to another embodiment, includes a processor, and
(Continued)

logic integrated with the processor, executable by the processor, or integrated with and executable by the processor. The logic is configured to perform the foregoing method.

17 Claims, 11 Drawing Sheets

(51) Int. Cl.

| | |
|---|---|
| *G06N 20/00* | (2019.01) |
| *G06V 10/40* | (2022.01) |
| *G06V 10/50* | (2022.01) |
| *G06V 30/148* | (2022.01) |
| *G06V 30/164* | (2022.01) |
| *G06V 30/18* | (2022.01) |
| *G06V 30/19* | (2022.01) |
| *G06V 30/262* | (2022.01) |
| *G06V 30/413* | (2022.01) |

(52) U.S. Cl.
CPC ...... *G06V 30/164* (2022.01); *G06V 30/19093* (2022.01); *G06V 30/19147* (2022.01); *G06V 30/262* (2022.01); *G06V 30/274* (2022.01); *G06V 30/413* (2022.01); *G06N 3/08* (2013.01); *G06N 20/00* (2019.01); *G06V 10/40* (2022.01); *G06V 30/18* (2022.01)

(58) Field of Classification Search
CPC ....... G06V 30/19093; G06V 30/19147; G06V 30/262; G06V 30/413; G06V 30/18; G06V 30/274; G06V 10/40
See application file for complete search history.

(56) References Cited

U.S. PATENT DOCUMENTS

| | | | |
|---|---|---|---|
| 10,275,266 B1 * | 4/2019 | Bhavineni | G06F 40/58 |
| 2016/0034450 A1 | 2/2016 | Chin et al. | |
| 2016/0140110 A1 | 5/2016 | Jania et al. | |
| 2017/0177712 A1 * | 6/2017 | Kopru | G06F 16/3337 |
| 2019/0129823 A1 * | 5/2019 | Pell | G06F 11/079 |
| 2022/0108556 A1 * | 4/2022 | Peng | G06F 40/103 |

OTHER PUBLICATIONS

Awwad et al., "Automated Bidirectional Languages Localization Testing for Android Apps with Rich GUI," Mobile Information Systems, Hindawi Publishing Corporation, 2016, pp. 1-14.
Macklon et al., "Automatically Detecting Visual Bugs in HTML5 <canvas> Games," arXiv, 2022, 11 pages, retrieved from https://arxiv.org/abs/2208.02335.

* cited by examiner

100

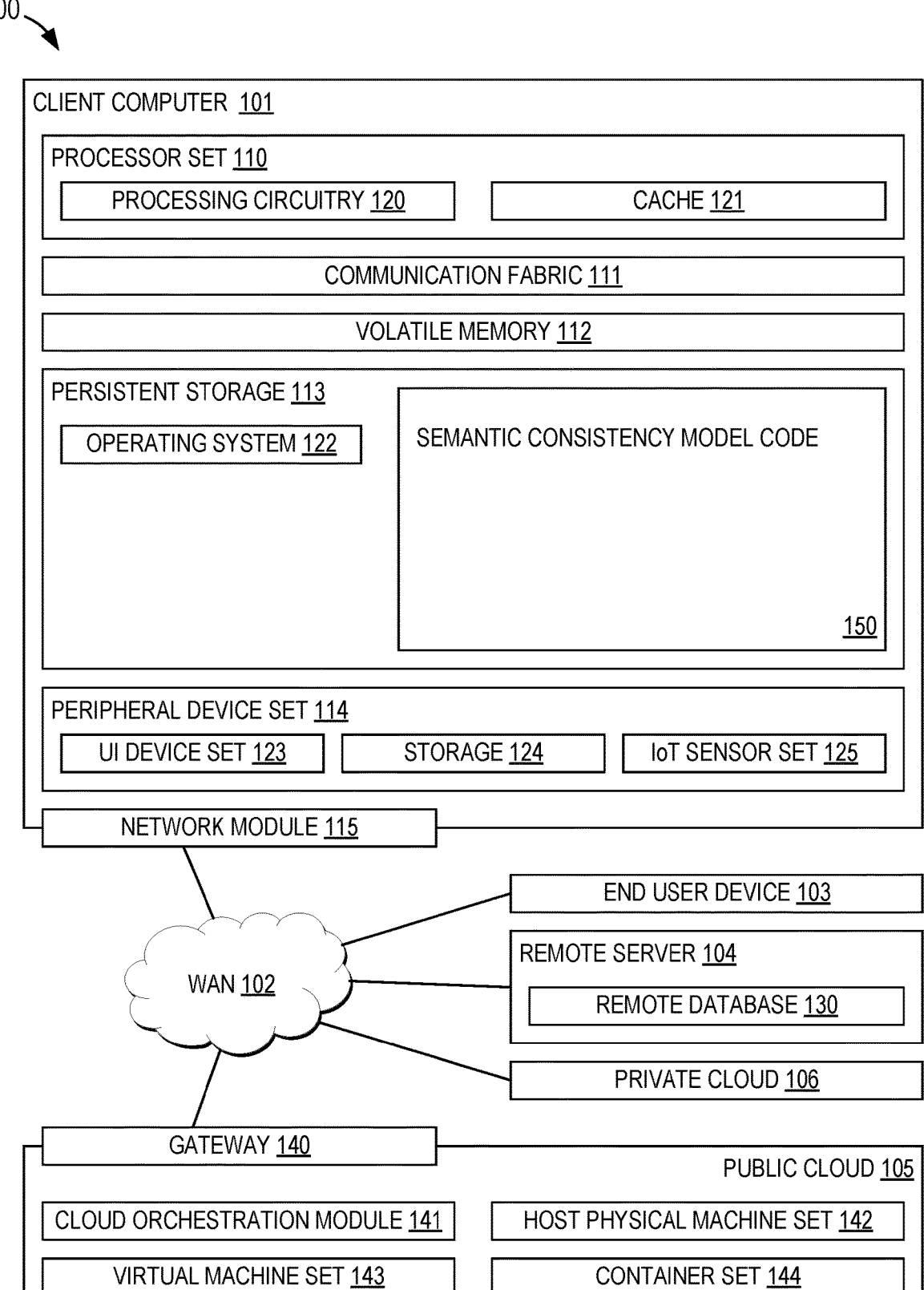

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

SEMANTIC CONSISTENCY MODEL CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

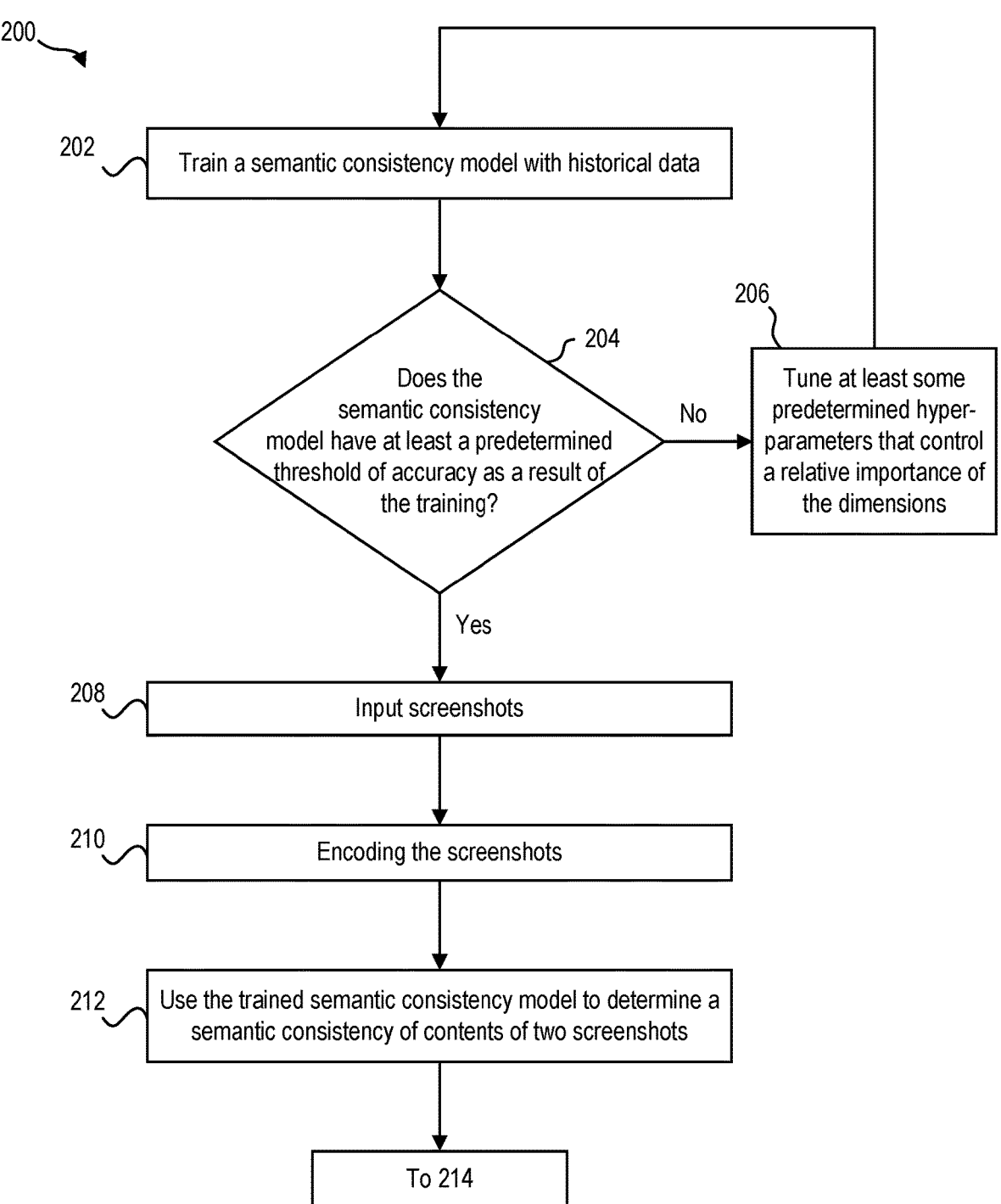

200

202 — Train a semantic consistency model with historical data

204 — Does the semantic consistency model have at least a predetermined threshold of accuracy as a result of the training?

No

206 — Tune at least some predetermined hyper-parameters that control a relative importance of the dimensions Yes 208 — Input screenshots 210 — Encoding the screenshots 212 — Use the trained semantic consistency model to determine a semantic consistency of contents of two screenshots To 214

FIG. 2

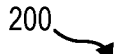
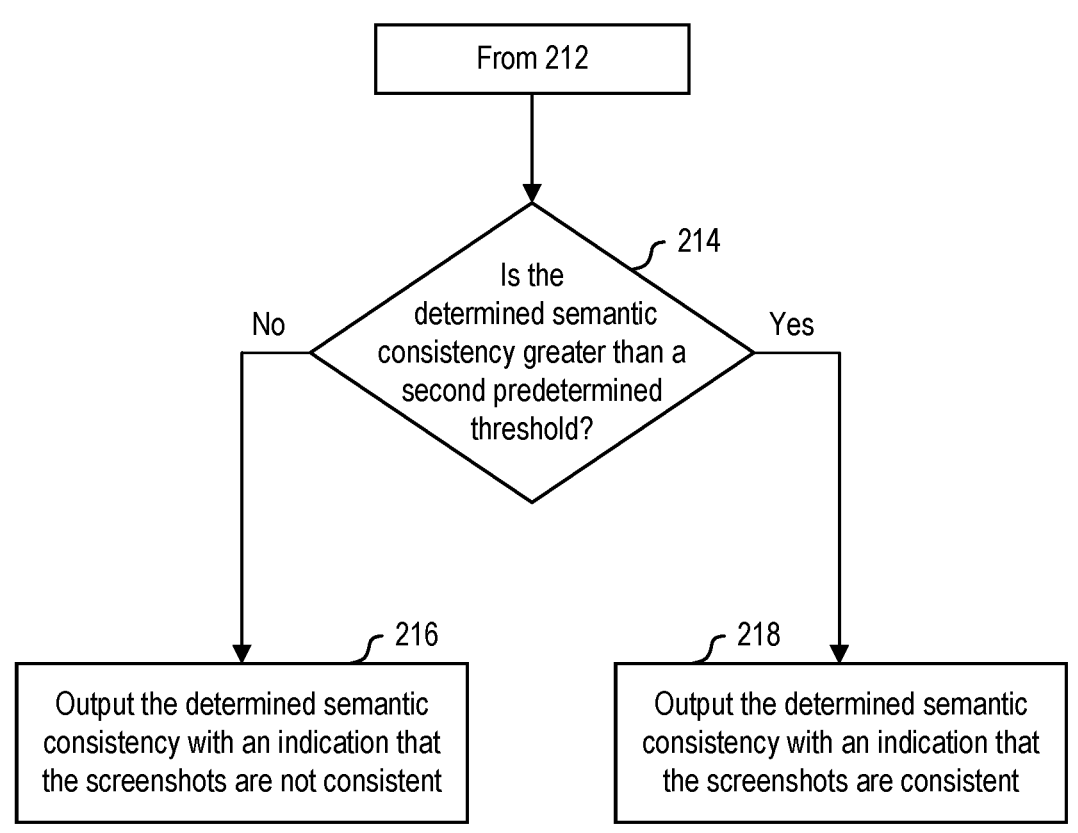
FIG. 2
(continued)

Image Block 1

Image Block 2

Image Block 3

SEMANTIC CONSISTENCY MODEL FOR DETERMINING A SEMANTIC CONSISTENCY OF CONTENTS OF AT LEAST TWO SCREENSHOTS

BACKGROUND

The present invention relates to language translation, and more specifically, this invention relates to using a trained semantic consistency model to determine a semantic consistency of contents of at least two screenshots.

A plurality of languages are used every day throughout the world. In order to enable communication between people who speak and/or write in different languages, language translation is performed on deliverables such as text documents.

In-context testing (ICT) is a post-translation process for different types of content, e.g., product UI messages or product documentation, as needed to ensure translation quality in completed deliverables. Errors caught by ICT may include mistranslation, partial translation, bad appearance, inconsistent translations or incorrect assembly (by a content submitter) of several translation strings, etc.

SUMMARY

A computer-implemented method, according to one embodiment, includes using a trained semantic consistency model to determine a semantic consistency of contents of two screenshots. The trained semantic consistency model bases the semantic consistency on dimensions including: a linguistic comparison of the contents, an image comparison of the contents, and a text location comparison of the contents. The method further includes outputting the determined semantic consistency for display on a user device.

A computer program product, according to another embodiment, includes a computer readable storage medium having program instructions embodied therewith. The program instructions are readable and/or executable by a computer to cause the computer to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 2 is a flowchart of a method, in accordance with one embodiment of the present invention.

FIG. 7B depicts an image comparison, in accordance with one embodiment of the present invention.

DETAILED DESCRIPTION

Figure 3:
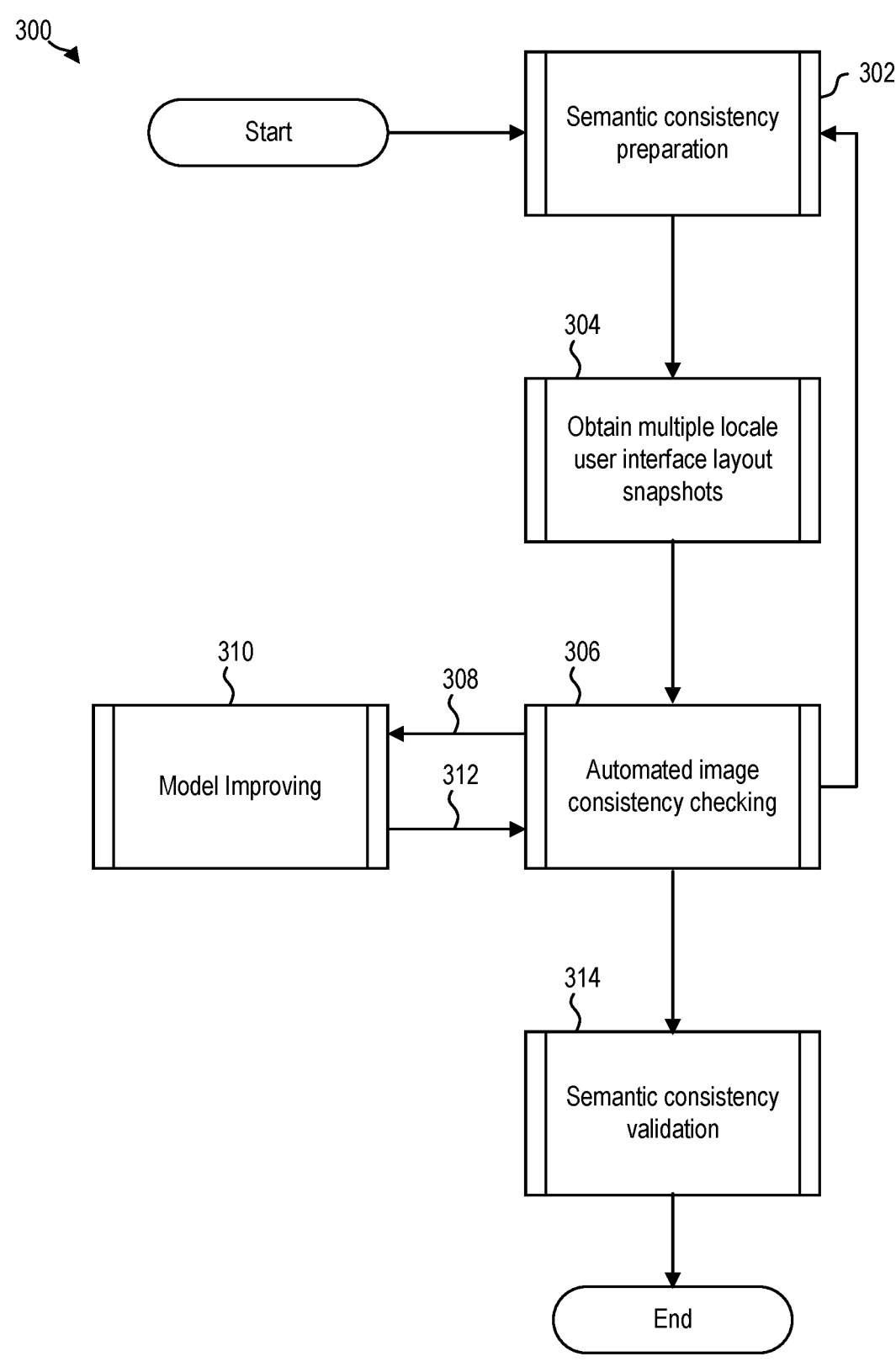
FIG. 3 is a flowchart of a method, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using a trained semantic consistency model to determine a semantic consistency of contents of at least two screenshots.

In one general embodiment, a computer-implemented method includes using a trained semantic consistency model to determine a semantic consistency of contents of two screenshots. The trained semantic consistency model bases the semantic consistency on dimensions including: a linguistic comparison of the contents, an image comparison of the contents, and a text location comparison of the contents. The method further includes outputting the determined semantic consistency for display on a user device.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as semantic consistency model code of block 150 for determining a semantic consistency of contents of at least two screenshots. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere herein, a plurality of languages are used every day throughout the world. To enable communication between people who speak and/or write in different languages, language translation is performed on deliverables such as text documents.

In-context testing (ICT) is a post-translation process for different types of content, e.g., product UI messages or product documentation, as needed to ensure translation quality in completed deliverables. Errors caught by ICT may include mistranslation, partial translation, bad appearance, inconsistent translations or incorrect assembly (by a content submitter) of several translation strings, etc.

Before ICT, product graphical user interface (GUI) screenshots are preferably taken for each language and sent to a predetermined language tester. However, there are often numerous issues associated with an unfamiliarity of languages that may be present in a screenshot. These issues include, but are not limited to, confusing language screenshots, mistakes existing in language screenshots, missing one or more strings (like tooltips or one or more other feature control buttons) on language screenshots with relatively less controls which thereby creates inconsistent screenshots, etc. It is also a relatively difficult, expensive and time consuming process to have a human manually check for mistakes in screenshots. Accordingly, there is a longstanding need within the field of language translation for a relatively efficient and accurate techniques for ensuring that language translations are accurate.

In sharp contrast to the deficiencies of the conventional techniques described above, various embodiments and approaches described herein include techniques for checking a semantic consistency of localized screen captures. Within at least some of these techniques, text segments with related metadata are extracted from screen captures. A lingual content of two images is then compared. Subsequent to this comparison, images may be divided into several parts based on generated metadata, and a graphical similarity of two images may be calculated. A model of checking a semantic consistency of localized screen captures with a lingual content comparison and a graphical similarity is also enabled. As a result, localized user interface (UI) problems are detected based on the multi-dimensional comparison results.

Now referring to FIG. 2, a flowchart of a method 200 is shown, according to one embodiment. The method 200 may be performed in accordance with the present invention in any of the environments depicted in FIGS. 1-8, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes training a semantic consistency model. In some approaches, the semantic consistency model may be trained using predetermined historical data. The semantic consistency model is preferably trained to determine a semantic consistency of contents of at least two screenshots. For context, the screenshots may, in some approaches, include, e.g., images, localized screenshots, documents, pictures, scans, etc. Furthermore, the contents of the screenshots may include, e.g., text, lines, words, patterns, shapes, objects, etc. The semantic consistency of these contents may be defined as how consistent, e.g., lingually consistent, visually consistent, include consistent features, etc., the contents of a second of the screenshots are subsequent to contents of a first of the screenshots being translated to the contents of the second screenshot.

The model may, in some approaches, be configuring to process at least two screenshots to determine a semantic consistency of the at least two screenshots. Note that the screenshots that are being processed by the model include the contents that are being caused, e.g., instructed, to analyzed by model to determine a semantic consistency of the screenshots. For example, the trained semantic consistency model may be configured to process at least two screenshots to determine predetermined dimensions that the semantic consistency are based on. Several of these dimensions are described below, in addition to techniques that may be used to determine such dimensions for at least two screenshots.

In some approaches, one of the dimensions that the semantic consistency model may be trained to base the semantic consistency of at least two screenshots on includes a linguistic comparison of the contents of the screenshots. Note that the screenshots, e.g., a first screenshot and a second screenshot, preferably include contents that are different languages. For example, in some approaches, the contents of the first screenshot include text of a first language, and the contents of the second screenshot include text of a second language that is different from the first language. The semantic consistency model may be, at least in part, trained by configuring the model to determine the linguistic comparison dimension of the contents of the screenshots by performing a predetermined first process. The predetermined first process may, in some approaches, include recognizing and extracting text from the two screenshots to determine text segments and text segment area coordinates for the extracted text. For purposes of an example, the associated text segments may, in some approaches, be represented by variable pairs: $T_a[n]$, $T_b[m]$, where "$T_a$" represents a text variable of the first screenshot "a", "$T_b$" represents a text variable of the second screenshot "b", "n" represents a given text segment of the first screenshot, and "m" represents a given text segment of the second screenshot. Furthermore, the text segment area coordinates may, in some approaches, be represented by associated variable pairs: $Co_a[n]$, $Co_b[m]$. For context, the term "associated" refers to contents of the first screenshot, e.g., a first text segment, that are translated into and thereby associated with a different state, e.g., language, positioning, form, color, etc., of content in the second screenshot. One or more image processing techniques for recognizing and extracting text from screenshots that would become apparent to one of ordinary skill in the art upon reading the descriptions herein may be used.

The predetermined first process may additionally and/or alternatively include calculating a vector value of each text, e.g., word, of the text segments, e.g., $v_a[i]=V(T_a[i])$, $v_b[j]=V(T_b[j])$. One or more known techniques for calculating a vector value for text in text segments that would become apparent to one of ordinary skill in the art upon reading the descriptions herein may be used.

The predetermined first process may additionally and/or alternatively include calculating a deviation value of vector pairs, in some approaches. For example, the deviation of the vector pair $[V_a, V_b]$ may be represented as: $f[m]=F(v_a[m], v_b[m])$, where in F( ), a language code will be treated as parameter $f[n]=F(v_a[n], [0])$ when n>m. In other words, "n>m" represents a condition in which more text segments of a first language are determined for the first screenshot than second text segments of a second language are determined for the second screenshot. In response to this condition being met, in some approaches, a value of zero is used for the missing vector value for calculating the deviation value. Furthermore, an overall text deviation of the two screenshots may be calculated. In some preferred approaches, the linguistic comparison dimension is the overall text deviation of the two screenshots. In one example, calculation of the overall text deviation of the two images may consider each of the deviations calculated for the vector pairs, e.g., an average. For example, the overall text deviation of the two images may be represented by: $h=H(Max(f[1 . . . n])|G(f[1 . . . n]))$ and h: [0,1], where "h" is the overall text deviation of the two screenshots. In some approaches, in order to highlight cases of "special", e.g., abnormal, text deviation, e.g., such as yes/no exchange permissions, text truncation, a text segment count being different for two screenshots, etc., the maximum, e.g., relatively highest, vector pair deviation value may be used for determining the overall text deviation of the two screenshots.

Another one of the dimensions that the semantic consistency model may, additionally and/or alternatively, be trained to base the semantic consistency of the at least two screenshots on includes an image comparison of the contents of the screenshots. The semantic consistency model may be, at least in part, trained by configuring the model to determine the image comparison dimension of the contents of the screenshots by performing a predetermined second process. The predetermined second process may, in some approaches, include grouping text in the screenshots by location based on text segment area coordinates. The text segment area coordinates may, in some approaches, include coordinates within the confines of each screenshot, and may additionally and/or alternatively be coordinates with a predetermined reference point in the first screenshot and/or be coordinates with a predetermined second reference point in the second screenshot. The second process may additionally and/or alternatively include dividing each of the screenshots into blocks. In some approaches, each of the blocks includes a different one of the text groupings. The text is preferably removed from the screenshots in the predetermined second process to reduce language noise, and thereby increase accuracy of determinations based on the image comparison dimension of the contents of the screenshots. Note that, one or more image processing techniques that would become apparent to one of ordinary skill in the art upon reading the descriptions herein may be used for dividing the image blocks and/or removing the text. Thereafter, an overall deviation value of the blocks may be calculated in the second predetermined process. A predetermined deviation processing algorithm and/or program may use the blocks and/or other metrics derived in the second predetermined process to perform such a calculation. The image comparison dimension is preferably the overall deviation value of the blocks in the predetermined second process.

The semantic consistency model may additionally and/or alternatively be, at least in part, trained by configuring the model to determine the image comparison dimension of the contents of the screenshots by performing a predetermined third process. The predetermined third process may, in some approaches, include segmenting the two screenshots into blocks, e.g., such as $I_a[n]$, $I_b[m]$ which is a block pair of the two screenshots. One or more image processing techniques that would become apparent to one of ordinary skill in the art upon reading the descriptions herein may be used to perform such segmenting. In some approaches, the blocks do not include any text, although in some other approaches, one or more of the blocks may include text. Vector values are, in some approaches, calculated for each of the blocks, e.g., $u_a[i]=U(I_a[n])$, $u_b[j]=U(I_b[m])$. Deviation values may then be calculated for pairs of the vector values, in some approaches, e.g., $e[m]=E(u_a[m], u_b[m])$ and $e[n]=E(u_a[n], [0])$ when n>m. It should be noted that each of these vector value pairs includes a vector value of a block of a first of the screenshots and a vector value of a block of a second of the screenshots. Finally, in some approaches, an overall deviation "p" of the two screenshots is calculated, e.g., p=P(Max (e[1 . . . n])|Q(e[1 . . . n])) and p: [0,1] where "p" which may be the image comparison dimension is the overall deviation (non-text graphical image deviation) of the two screenshots. Vector calculation techniques that would become apparent to one of ordinary skill in the art upon reading the descriptions herein may be used in one or more operations of the predetermined third process.

Another one of the dimensions that the semantic consistency model may, additionally and/or alternatively, be trained to base the semantic consistency of the at least two screenshots on includes a text location comparison of the contents of the screenshots. The text location comparison of the contents of the screenshots may compare text location, e.g., layout, differences in the two screenshots. The semantic consistency model may be, at least in part, trained by configuring the model to determine the text location comparison dimension of the contents of the screenshots by performing a predetermined fourth process. The predetermined fourth process may, in some approaches, include comparing text segment area coordinates of the two screenshots with one another, e.g., comparing each of the text segment area coordinates one by one. A deviation compensation "V" which will affect a next location comparison and/or a location comparison result "D" may be determined during these comparisons using techniques that would become apparent to one of ordinary skill in the art upon reading the descriptions herein. The predetermined fourth process, in some approaches, further includes calculating an overall text location deviation of text of the two screenshots based on the text segment area coordinate comparisons. In some approaches, the text location comparison dimension is the overall text location deviation, e.g., t=Fd(D[1 . . . n]).

The semantic consistency model is configured to base semantic consistency on one or more of the dimensions described above, e.g., the linguistic comparison dimension, the image comparison dimension and the text location dimension. In some preferred approaches, the semantic consistency model is configured to base the semantic consistency on one or more of the dimensions described above using the following predetermined equation:

$$\text{Semantic consistency score} = a * (h) + b * (p) + c * (t) \qquad \text{Equation (1)}$$

where the variable "a" is a hyper-parameter that controls a relative importance of the linguistic comparison dimension which is a "text" dimension of the contents of the screenshots, the variable "b" is a hyper-parameter that controls a relative importance of the image comparison dimension which is a "non-text" dimension of the contents of the screenshots, the variable "c" is a hyper-parameter that controls a relative importance of the text location comparison dimension which is a "text location" dimension of the contents of the screenshots, "h" is a variable that represents the linguistic comparison dimension, "p" is a variable that represents the image comparison dimension, and "t" is a variable that represents the text location comparison dimension. Equation (1) may be used to train the model by causing training data to be input into the equation and adjusting the hyper-parameters until a predetermined degree of accuracy is met. For example, method 200 may include training the model with historical data and tuning one or more of the hyperparameters a predetermined amount to improve accuracy of the semantic consistency model.

In some approaches, the initial training of the semantic consistency model may include inputting historical data with predetermined amounts of semantic consistency into the semantic consistency model. Note that the model does not have access to the predetermined amounts of semantic consistency, but instead, the predetermined amounts of semantic consistency are used to determine a relative accuracy of the semantic consistency model. For example, in some approaches, the semantic consistency model may be caused to process the historical data, and a determined semantic consistency of the training data. The determined semantic consistency may be compared with the predetermined amounts of semantic consistency to determine whether the model has at least a predetermined threshold of accuracy. Such a comparison may be performed in order to determine whether the semantic consistency model has at least a predetermined threshold of accuracy as a result of the training, e.g., see operation 204. In some approaches, the predetermined threshold of accuracy is set by an administrator and/or a subject matter expert (SME).

In response to a determination that the semantic consistency model does not have at least a predetermined threshold of accuracy as a result of the training, e.g., as illustrated by the "No" logical path of decision 204, at least some predetermined hyper-parameters that control a relative importance of the dimensions may be tuned, e.g., see operation 206. For example, these hyper-parameters include "a", "b" and "c" in Equation (1) above. Furthermore, use of the trained semantic consistency model in a determination of the semantic consistency of the contents of two screenshots may, in some approaches, be delayed at least until additional training data is applied to train the semantic consistency model and/or it is determined that the semantic consistency model does not have at least a predetermined threshold of accuracy as a result of the training. In contrast, in response to a determination that the semantic consistency model has at least a predetermined threshold of accuracy as a result of the training, e.g., as illustrated by the "Yes" logical path of decision 204, it may be determined that the semantic consistency model is trained, and the trained semantic consistency model is used to determine a semantic consistency of contents of at least two screenshots. In order to determine the semantic consistency of contents of the at least two screenshots, in some approaches, method 200 includes inputting the at least two screenshots into the trained semantic consistency model, e.g., see operation 208. Predetermined encoding operations may be caused to be performed by the semantic consistency model on the screenshots, e.g., see operation 210. For example, the encoding operations may include using predetermined known type of image analysis techniques on one or more of the screenshots in order to identify one or more contents of the screenshots that are used by the semantic consistency model to determine the semantic consistency of contents of two screenshots. Operation 212 includes using the trained semantic consistency model to determine the semantic consistency of contents of the at least two screenshots. The proposed method 200 preferably analyzes both the semantic similarity and a position of content within the screenshots. In order to enable such analysis, the text contents of the screenshots may be retrieved, as well as a relative position of such text. Then, a comparison of semantic similarity between the different language text of the screenshots is performed as well as a position of such contents. For example, the trained semantic consistency model preferably bases the semantic consistency on at least some of the dimensions mentioned elsewhere herein for training the semantic consistency model, e.g., the linguistic comparison dimension, the image comparison dimension and the text location dimension.

In some approaches, the determined semantic consistency is a score of a predetermined range of potential scores, e.g., 1-10, 1-100, 1-210, etc. This way, the determined semantic consistency may be considered with respect to the predetermined range in order to determine whether the determined semantic consistency score is a relatively low score which may indicate that the contents of the two screenshots are not relatively similar, or a relatively high score which may indicate that the contents of the two screenshots are relatively similar. The determined semantic consistency, e.g., score, may be determined with a second predetermined threshold. For example, method 200 includes determining whether the determined semantic consistency is greater than a second predetermined threshold, e.g., see decision 214. The second predetermined threshold may be, in some approaches, dynamically set, e.g., by an administrator. In some approaches, the second predetermined threshold is used to determine whether to conclude that the screenshots are consistent, or to conclude that the screenshots are not consistent. For example, in some approaches, subsequent to a determination that the semantic consistency score of the screenshots, only the screenshots with scores above the second predetermined threshold may be determined to be consistent, e.g., see "Yes" logical path of decision 214 continue to operation 218. In response to a determination that the screenshots are determined to be consistent, in some approaches, the determined semantic consistency, e.g., the score, is output for display on a user device. More specifically, in some approaches, in response to a determination that the semantic consistency score of the screenshots is equal to or greater than the predetermined threshold set for an associated language, the new translation, e.g., the second screenshot, is displayed on a user interface of the user device. The output may include an indication that the screenshots are consistent, e.g., a check mark of a predetermined color, a predetermined phrase, a predetermined flag that is set, metadata that indicates that the screenshots are consistent, etc.

In contrast, in some approaches, subsequent to a determination that the semantic consistency score of the screenshots, the screenshots with scores determined to be below the second predetermined threshold, may be determined to be not consistent, e.g., see "No" logical path of decision 214 continue to operation 216. In response to a determination that the screenshots are determined to be not consistent, in some approaches, the determined semantic consistency, e.g., the score, is output for display on a user device. More specifically, in some approaches, in response to a determination that the semantic consistency score of the screenshots is less than the predetermined threshold set for an associated language, the new translation, e.g., the second screenshot, is not displayed on a user interface of the user device. In some approaches, the semantic consistency score of the screenshots may be caused and/or determined to be less than the predetermined threshold set for an associated language based on one or more factors, e.g., a screenshot of the translation may be relatively old, the position of a presentation of contents within the screenshot is incorrect, etc. The output may include an indication that the screenshots are not consistent, e.g., an "X" mark of a second predetermined color, a predetermined phrase, a predetermined flag that is set, metadata that indicates that the screenshots are not consistent, etc. In some approaches, in response to a determination that the screenshots are not consistent, one or more dimensions of the screenshots that the determined inconsistencies are based on may be detailed in metadata in the output, along with a suggested solution for correcting the inconsistency. This allows for a reduction in computer processing operations that would otherwise be performed to analyze the screenshots for determining a root cause of the inconsistency in the screenshots where one of the screenshots is a translation of the other screenshot.

In some approaches, thresholds used to determine whether to conclude that the screenshots are consistent may be language dependent and defined by the following equation:

$$F(x) = \left(2e^{vx^2}\right) / 1 + e^{vx^2} \qquad \text{Equation (2)}$$

where "e" is Euler's number, "v" is a predetermined set parameter, e.g., such as the value 0.05, and "x" is accuracy. In such approaches, the idea is based on a principle that the trained model has different accuracies for different language content within screenshots, and thereby the predetermined threshold values are set to be higher in response to a determination that the accuracy of the trained model is lower and vice versa. This behavior fits the sigmoid function after flipping over the y-axis of a linear plot of a first line that represents an accuracy of the trained model and a second line that represents the predetermined threshold value, e.g., see FIG. 8. Accordingly, a function expression is defined and the relatively best parameter may be set by experimenting with historical data. In some approaches, in response to a determination that an accuracy of the trained semantic consistency model has improved, the second predetermined threshold may be optionally dynamically adjusted.

Numerous benefits are enabled as a result of implementing techniques described herein into the technical field of linguistic analysis of screenshots. For example, accuracy of screenshot comparisons and translations is significantly improved (as compared to conventional ICT techniques). This is because conventional ICT techniques fail to consider dimensions using the dimensions described herein. In other words, use of a trained semantic consistency model to determine a semantic consistency of contents of at least two screenshots has heretofore not been considered in conventional applications. Accordingly, the inventive discoveries disclosed herein with regards to use of a trained semantic consistency model to determine a semantic consistency of contents of at least two screenshots proceed contrary to conventional wisdom. This increase in accuracy also reduces an amount of computer processing that is performed, because otherwise incorrectly analyzing two screenshots would allow a consistency of screenshots to be inaccurately portrayed. This inaccurate presentation of the consistency of screenshots is associated with additional computer operations being performed, because a user using these screenshots will likely experience missing data and/or features, and therefore additional troubleshooting will be required to be performed to determine and correct the screenshot inconsistencies. The benefits enabled as a result of implementing the techniques described herein furthermore include solving the problem of conventional techniques being unable to perform automatic comparison of multi-language screenshots. Also, based on the comparison results obtained using the techniques described herein, most automated multi-language screenshots testing, and verification work is able to be relatively efficiently performed.

Now referring to FIG. 3, a flowchart of a method 300 is shown, according to one embodiment. The method 300 may be performed in accordance with the present invention in any of the environments depicted in FIGS. 1-8, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 illustrates a relatively high level flowchart for using a trained semantic consistency model to determine a semantic consistency of contents of at least two screenshots. The method 300 may, in some approaches, be initiated, e.g., see Start, in response to receiving a request for verifying that contents of screenshots are semantically consistent. Operation 302 includes performing semantic consistency preparation, which may, in some approaches, include training a semantic consistency model with predetermined historical data, e.g., using techniques described elsewhere herein. In some approaches, method 300 includes obtaining multiple, e.g., at least two, locale user interface (UI) layout screenshots, e.g., see operation 304, which may include content of different languages. In some approaches, the screenshots are received as output of a predetermined translation model, and therefore the content of at least a first of the screenshots may be a translation of, and thereby associated with, the content of a second of the screenshots.

Operation 306 includes using the trained semantic consistency model to determine a semantic consistency of contents of at least two of the screenshots. In some approaches, an accuracy of the trained semantic consistency model may be improved, e.g., see determinations of operation 306 input, e.g., see operation 308 into a predetermined model 310 for improving and providing feedback, e.g., see operation 312 to the trained semantic consistency model. In some approaches, the predetermined model 310 may be configured to, e.g., have a SME verify a score generated by the trained semantic consistency model, refine hyper-parameters of an equation used by the trained semantic consistency model, etc.

Operation 314 includes outputting a semantic consistency validation, e.g., an indication that the screenshots are consistent, an indication that the screenshots are not consistent, a determined semantic consistency score, etc. Subsequent to the outputting, the method 300 optionally ends, e.g., see End. In some other approaches, the method 300 does not end, but rather a semantic consistency of additional screenshots is determined by the trained semantic consistency model.

Figures 4A, 4B:
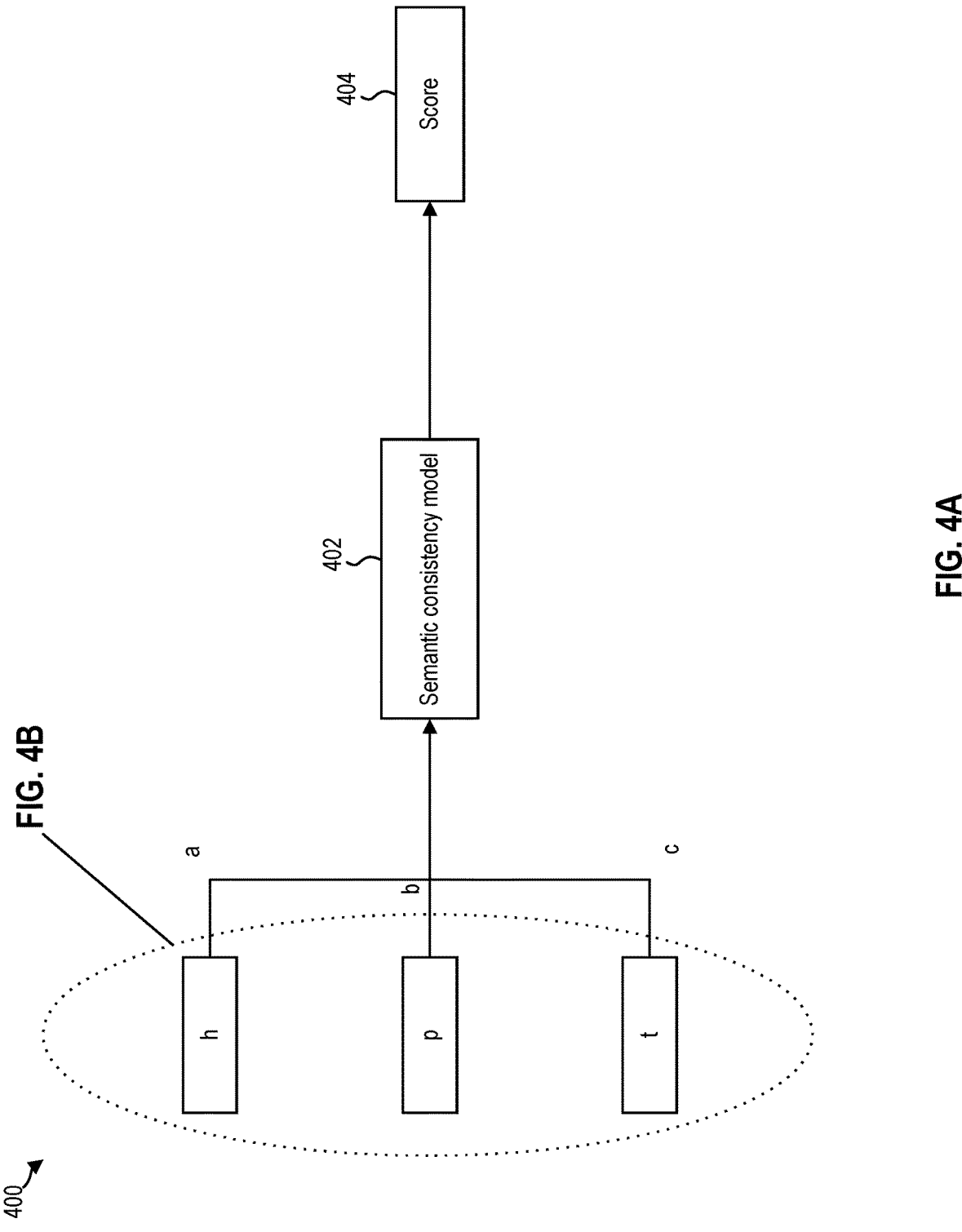
FIG. 4A is a representation of a process of determining a semantic consistency of contents of screenshots, in accordance with one embodiment of the present invention.
FIG. 4B is a representation of a portion of the representation of FIG. 4A, in accordance with one embodiment of the present invention.
Figure 4B:
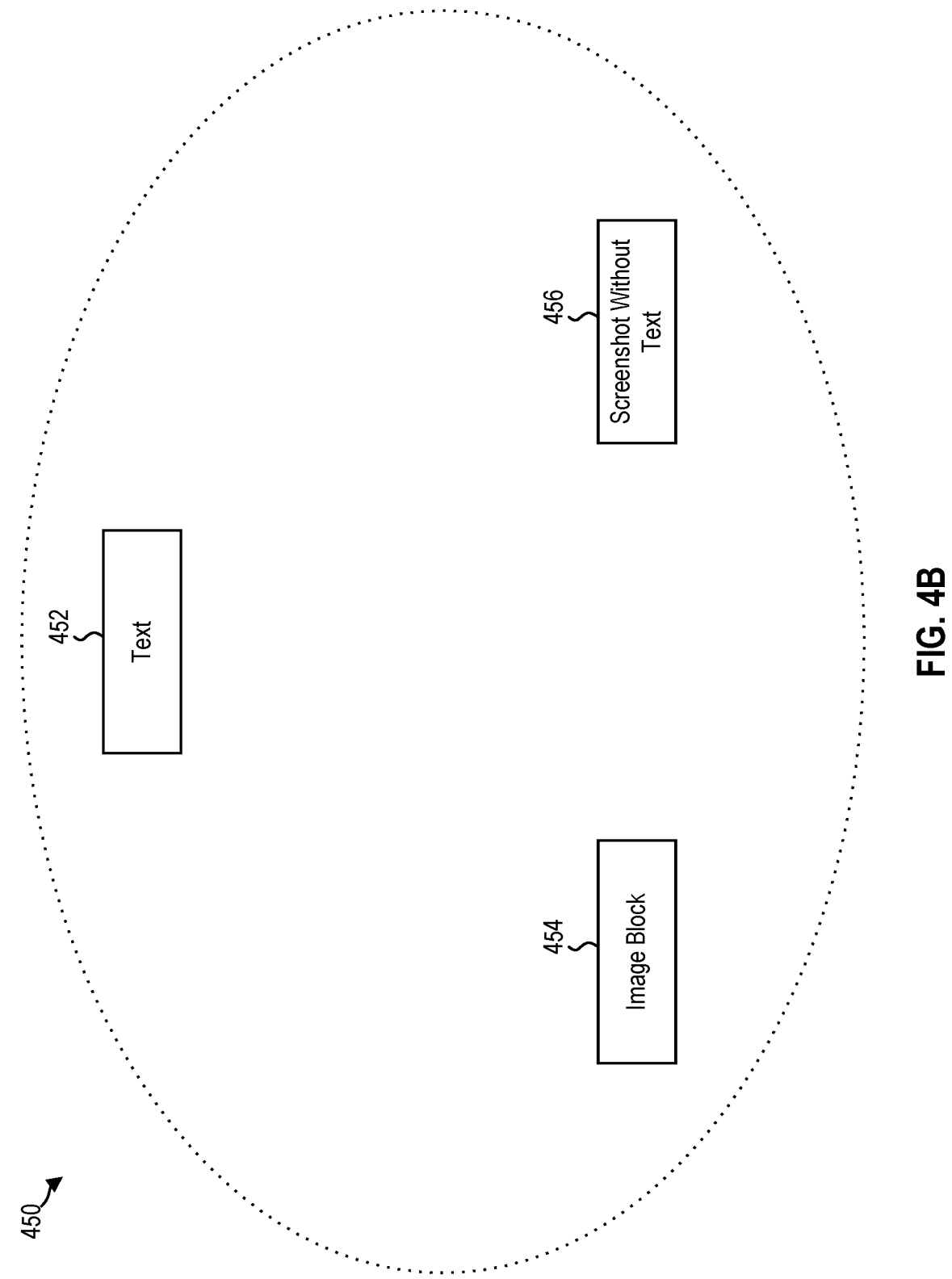

FIG. 4A depicts a representation 400 of a process of determining a semantic consistency of contents of screenshots and FIG. 4B depicts a representation 450 of a portion of the representation 400, in accordance with various embodiments. As an option, the present representations 400, 450 may be implemented in conjunction with features from any other embodiment listed herein, such as those described with reference to the other FIGS. Of course, however, such representations 400, 450 and others presented herein may be used in various applications and/or in permutations which may or may not be specifically described in the illustrative embodiments listed herein. Further, the representations 400, 450 presented herein may be used in any desired environment.

With reference first to FIG. 4A, representation 400 includes a semantic consistency model 402. The semantic consistency model 402 is configured to, e.g., based on training the model using predetermined training data, base a semantic consistency score 404 on dimensions. For example, a first of such dimensions includes "h" which is a variable that represents a linguistic comparison dimension of a comparison of contents of the two screenshots. A relative importance of the linguistic comparison dimension variable "h" in the determination of the semantic consistency score 404 is controlled by hyper-parameter "a", which is adjustable. A second of such dimensions includes "p" which is a variable that represents an image comparison dimension of the comparison of contents of the two screenshots. A relative importance of the dimension variable "p" in the determination of the semantic consistency score 404 is controlled by hyper-parameter "b", which is adjustable. Furthermore, a third of such dimensions includes "t" which is a variable that represents a text location comparison dimension of the comparison of contents of the two screenshots. A relative importance of the dimension variable "t" in the determination of the semantic consistency score 404 is controlled by hyper-parameter "c", which is adjustable.

Referring now to FIG. 4B, representation 450 includes a portion of the representation 400. Specifically, representation 450 illustrates the dimensions "h", "p" and "t", in accordance with one approach. For example, the linguistic comparison dimension is represented as a "Text" dimension 452 of the contents of the screenshots. Furthermore, the image comparison dimension is represented as an "Image Block" dimension 454 of the contents of the screenshots. The text location comparison dimension is represented as a "Screenshot Without Text" dimension 456 of the contents of the screenshots.

Figure 5:
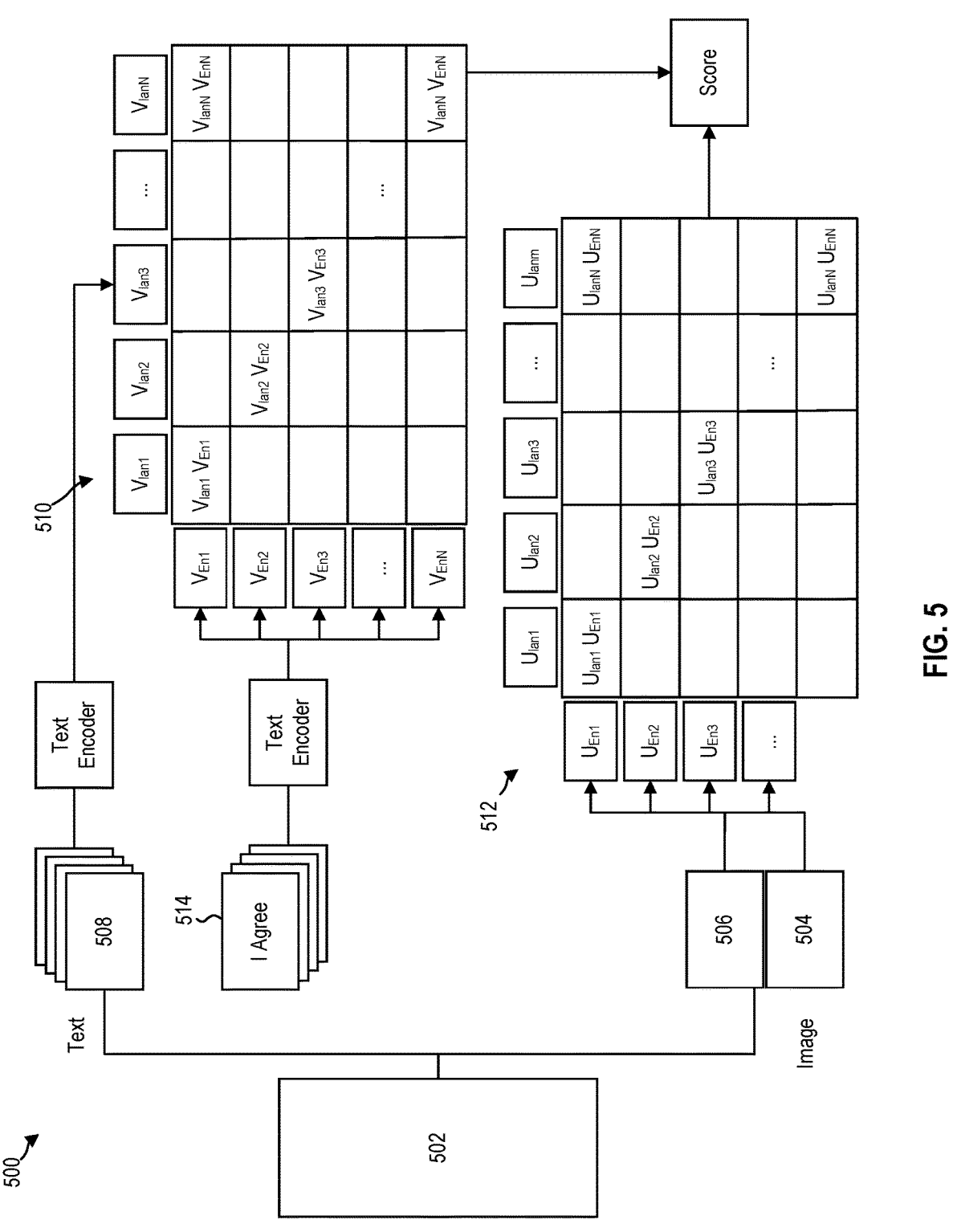
FIG. 5 depicts an overview of an implementation of using a trained semantic consistency model to determine a semantic consistency of contents of at least two screenshots, in accordance with one embodiment of the present invention.

FIG. 5 depicts an overview 500 of an implementation of using a trained semantic consistency model to determine a semantic consistency of contents of at least two screenshots, in accordance with one embodiment. As an option, the present overview 500 may be implemented in conjunction with features from any other embodiment listed herein, such as those described with reference to the other FIGS. Of course, however, such overview 500 and others presented herein may be used in various applications and/or in permutations which may or may not be specifically described in the illustrative embodiments listed herein. Further, the overview 500 presented herein may be used in any desired environment.

Overview 500 includes a text sample 502 that may be translated into another language, e.g., see a first screenshot 504 that includes contents of a first language and a second screenshot 506 that includes contents of a second language. It should be noted that analysis of contents of text samples using the techniques described herein is preferably only performed subsequent to gaining permission of an owner of the contents to do so, e.g., see "I Agree" opt-in condition 514. As will be described below, dimensions determined from contents of a first screenshot that are of a first language are compared with dimensions determined from contents of a second screenshot that are of a second language to determine a semantic consistency score, e.g., see Score. More specifically, for each of the dimensions, a trained semantic consistency model is caused to compare contents of the first screenshot with associated contents of the second screenshot to determine the semantic consistency score which may be output to a user interface of a user device.

In some preferred approaches, a semantic consistency score, e.g., see "Score", for snapshots of the text sample 502 is obtained through the analysis of semantics and their position. The final semantic consistency score may be determined by combining the analysis results of non-text screenshots. For example, text 508 of the snapshots of the text sample may be extracted, e.g., see text encoder. More specifically, such text may be recognized and extracted from the two screenshots to determine text segments and text segment area coordinates for the extracted text. A vector value of each text of the text segments may be calculated, e.g., see vector value pairs $V_{lan1}$ $V_{En1}$, $V_{lan2}$ $V_{En2}$, etc., which may be arranged in a vector, e.g., see first vector 510. In some approaches, a deviation value of vector pairs may be calculated and an overall text deviation of the two screenshots may be calculated. Results of these calculations may be incorporated into the semantic consistency score, e.g., see using Equation (1) described elsewhere above.

In another example, the screenshots may be segmented into blocks, using techniques described elsewhere herein, e.g., see method 200, and vector values for each of the blocks may be calculated, e.g., see $U_{En1}$ and $U_{lan1}$. Deviation values for pairs of the vector values may be calculated, e.g., see pairs of the vector values in the second vector 512. Note that each vector value pair includes a vector value of a block of a first of the screenshots and a vector value of a block of a second of the screenshots. Thereafter, an overall deviation value of the two screenshots may be calculated where the image comparison dimension is the overall deviation value of the two screenshots. The overall deviation may be incorporated into the semantic consistency score, e.g., see using Equation (1) described elsewhere above.

Figure 6:
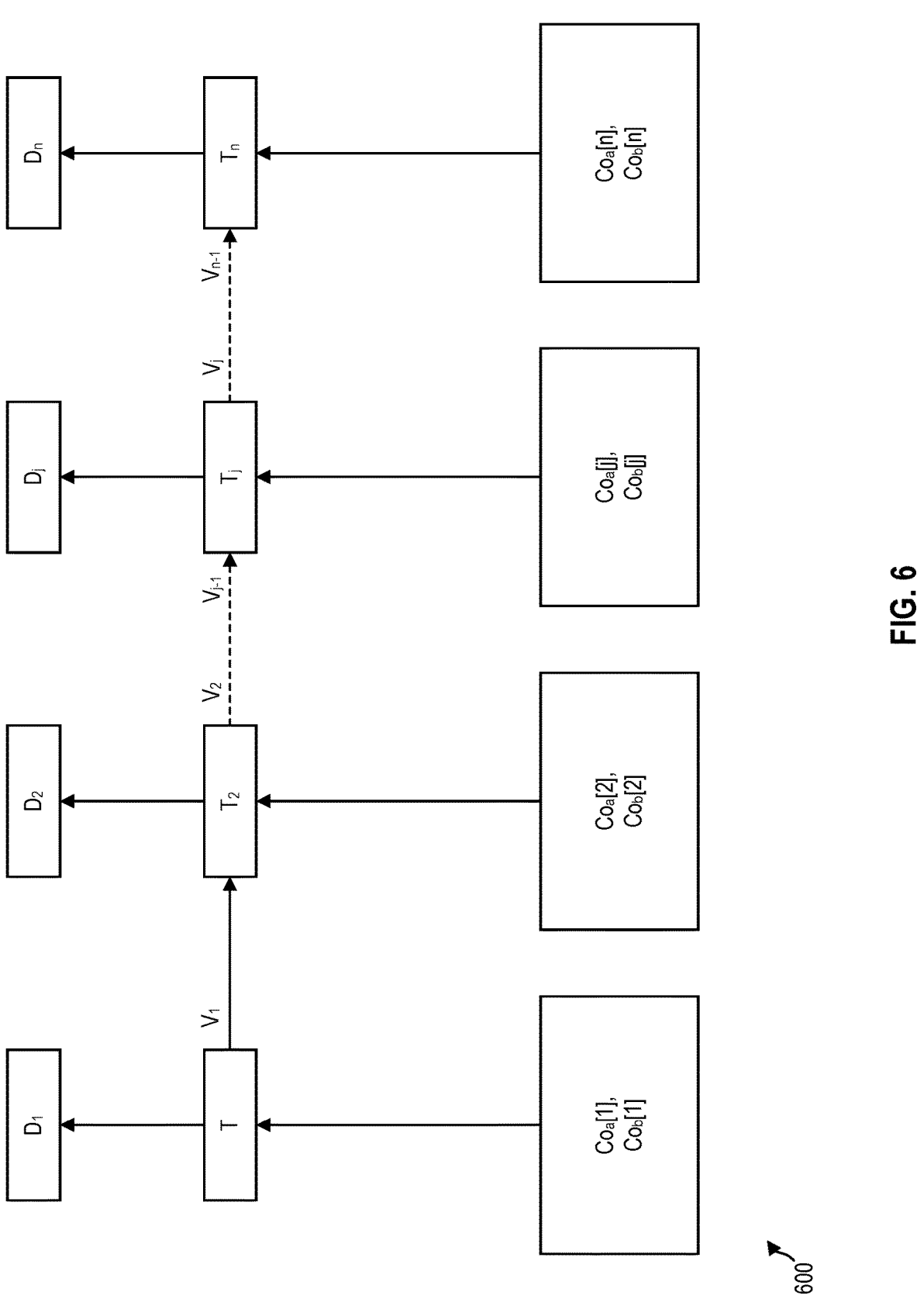
FIG. 6 depicts a representation of a text location, in accordance with one embodiment of the present invention.

FIG. 6 depicts a representation 600 of text location, in accordance with one embodiment. As an option, the present representation 600 may be implemented in conjunction with features from any other embodiment listed herein, such as those described with reference to the other FIGS. Of course, however, such representation 600 and others presented herein may be used in various applications and/or in permutations which may or may not be specifically described in the illustrative embodiments listed herein. Further, the representation 600 presented herein may be used in any desired environment.

Representation 600 illustrates the predetermined fourth process described elsewhere herein in method 200. The fourth predetermined process, in some approaches, includes comparing text segment area coordinates, e.g., see $Co_a$ and $Co_b$, of the two screenshots with one another, e.g., comparing each of the text segment area coordinates one by one. A deviation compensation "V" which will affect a next location comparison and/or a location comparison result "D" may be determined during these comparisons using techniques that would become apparent to one of ordinary skill in the art upon reading the descriptions herein. The predetermined fourth process, in some approaches, further includes calculating an overall text location deviation of text of the two screenshots based on the text segment area coordinate comparisons. In some approaches, the text location comparison dimension is the overall text location deviation, e.g., $t=Fd(D[1 \ldots n])$.

Figure 7A:
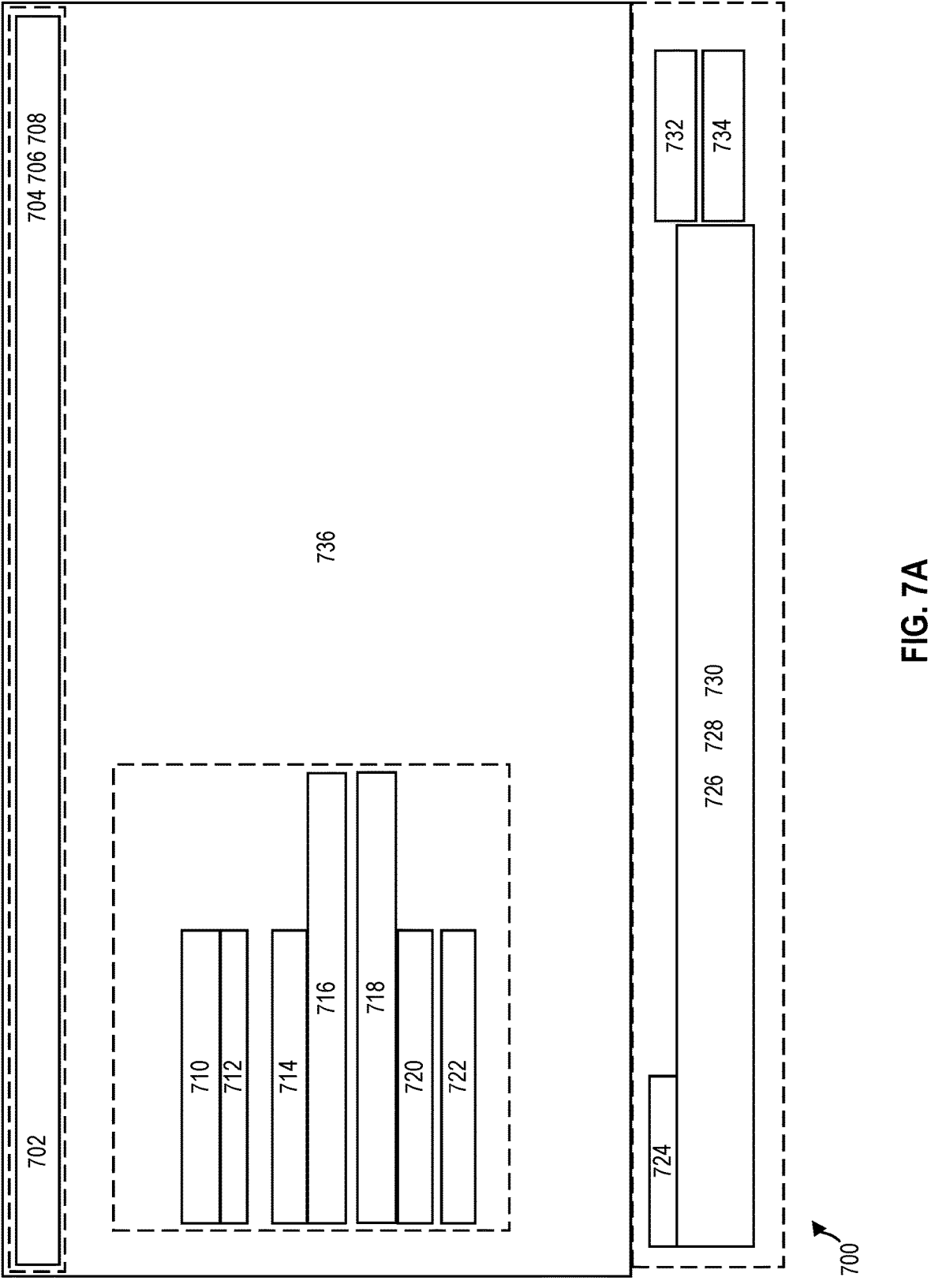
FIG. 7A depicts an image comparison, in accordance with one embodiment of the present invention.
Figure 7B:
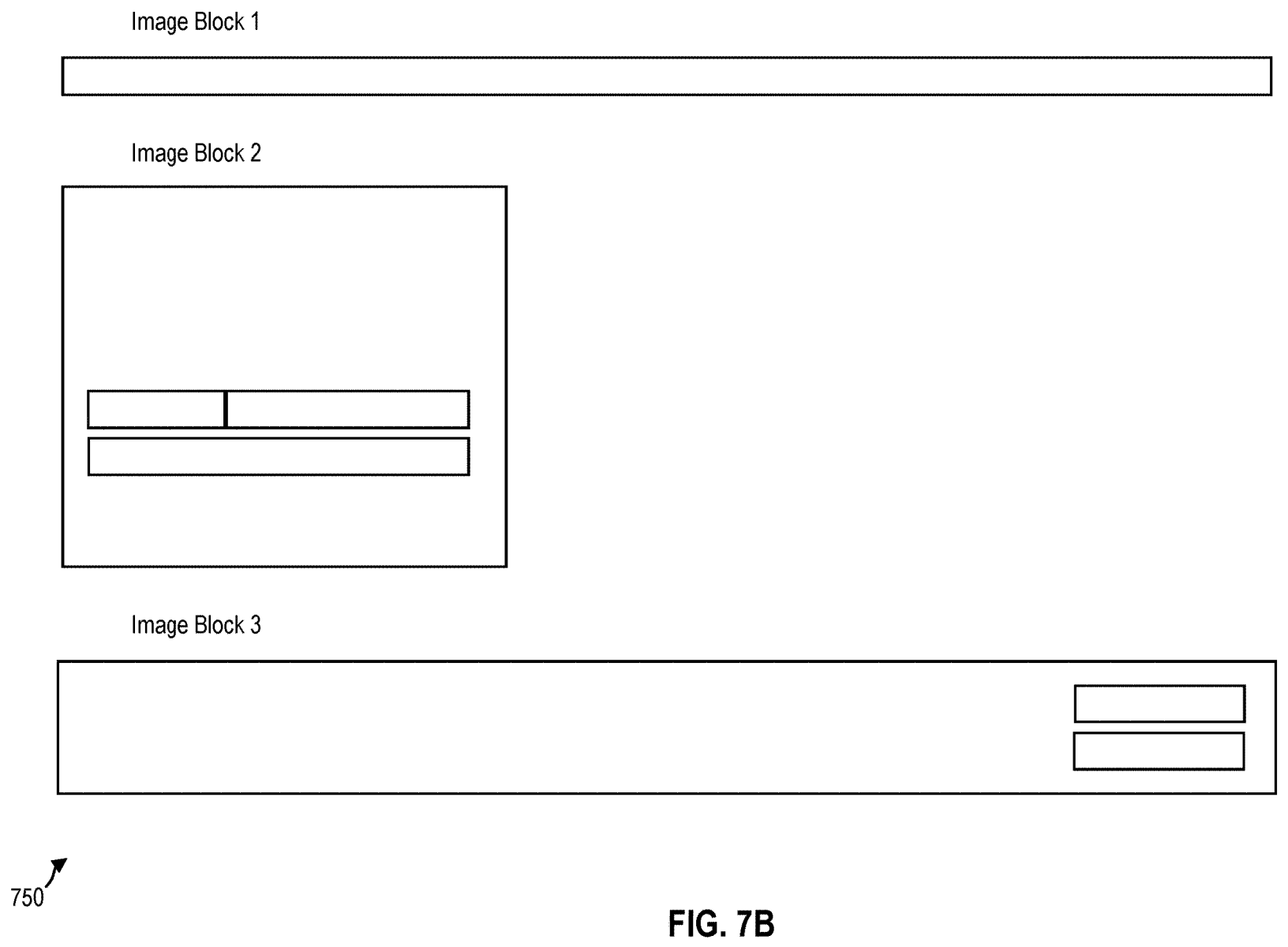

FIG. 7A depicts an image comparison 700, and FIG. 7B depicts an image comparison 750, in accordance with several embodiments. As an option, the present image comparisons 700 and 750 may be implemented in conjunction with features from any other embodiment listed herein, such as those described with reference to the other FIGS. Of course, however, such image comparisons 700 and 750 and others presented herein may be used in various applications and/or in permutations which may or may not be specifically described in the illustrative embodiments listed herein. Further, the image comparisons 700 and 750 presented herein may be used in any desired environment.

Referring first to FIG. 7A, image comparison 700 includes a first screenshot 736 that includes contents such as a plurality of text segments, e.g., see 702-730. The first screenshot furthermore includes contents such as a plurality of website features, e.g., see feature 732 which is an accept all opt-in feature and feature 734 which is a required only opt-in feature.

The image comparison may include comparing the contents of the first screenshot with contents of a second screenshot. In order to enable the comparison of the contents, a predetermined process may be performed. The predetermined process may, in some approaches, include grouping text in the screenshots by location based on text segment area coordinates. Furthermore, each of the screenshots are divided into blocks, e.g., see each of the text segments and features surrounded by a block. The text may then be removed from the screenshots to reduce language noise, and an overall deviation value of the blocks may be calculated.

Referring now to FIG. 7B, image comparison 750 includes a second screenshot. Content of the screenshot may be compared with content of another screenshot using a predetermined process. The predetermined process may include segmenting the screenshots into blocks, e.g., see Image Block 1, Image Block 2 and Image Block 3. Vector values for each of the blocks may be calculated, and deviation values for pairs of the vector values may thereafter be calculated. Note that each vector value pair includes a vector value of a block of a first of the screenshots and a vector value of a block of the second of the screenshots. Then an overall deviation value of the two screenshots may be calculated, and the image comparison dimension is the overall deviation value of the two screenshots. Techniques for performing the predetermined process are described in greater detail elsewhere herein, e.g., see the predetermined third process of method 200.

Figure 8:
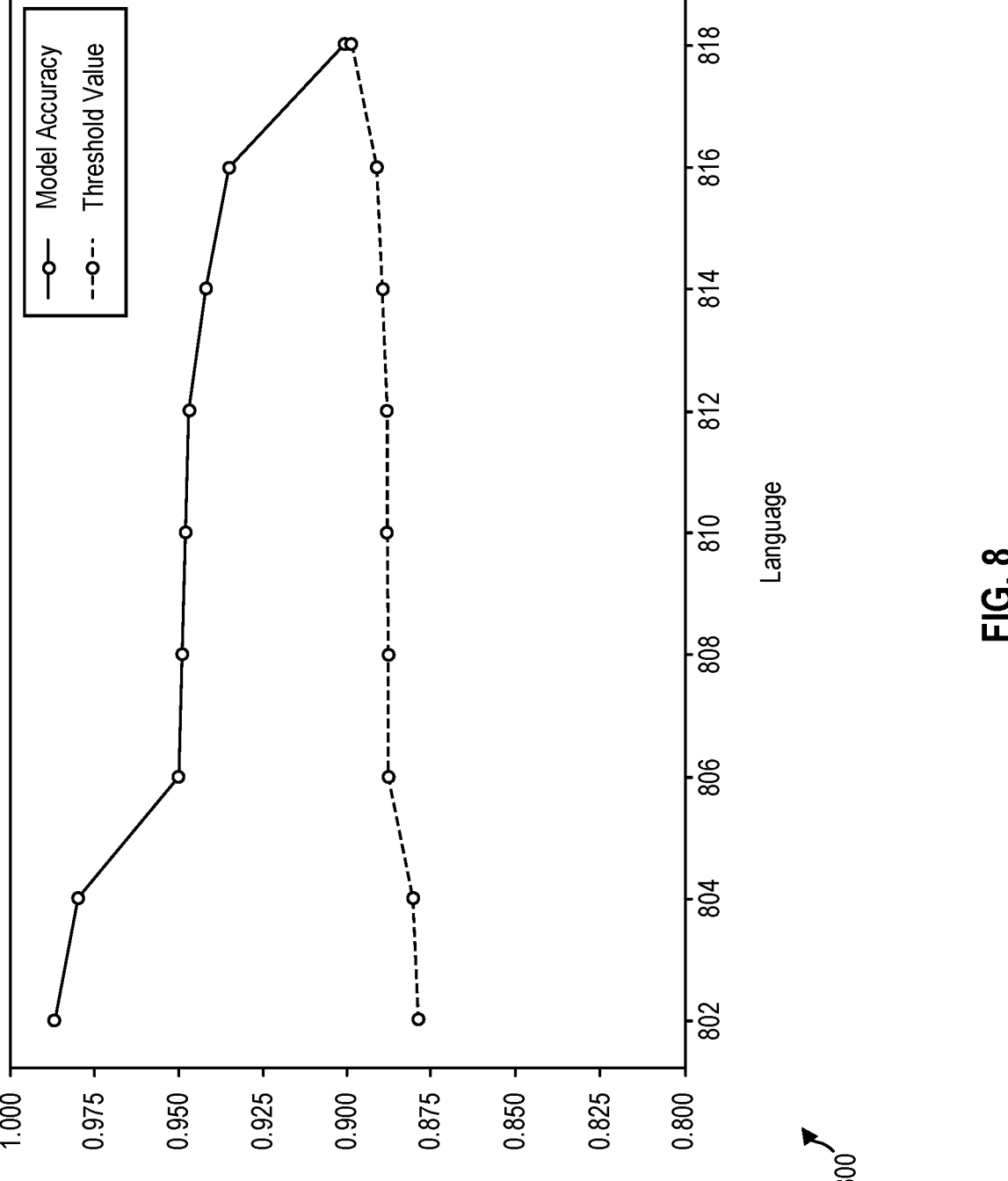
FIG. 8 depicts a graph, in accordance with one embodiment of the present invention.

FIG. 8 depicts a graph 800, in accordance with one embodiment. As an option, the present graph may be implemented in conjunction with features from any other embodiment listed herein, such as those described with reference to the other FIGS. Of course, however, such a graph and others presented herein may be used in various applications and/or in permutations which may or may not be specifically described in the illustrative embodiments listed herein. Further, the graph presented herein may be used in any desired environment.

The graph 800 illustrates how predetermined thresholds are used to determine whether to conclude that screenshots are consistent. In some approaches, graph 800 is based on a principle that the trained semantic consistency model, described in various embodiments and approaches herein, may have different accuracies for different language content within screenshots, and thereby the predetermined threshold values may be different for different languages. For example, the x-axis of graph 800 represents different languages, e.g., a first language 802, a second language 804, a third language 806, a fourth language 808, a fifth language 810, a sixth language 812, a seventh language 814, an eighth language 816 and a ninth language 818, which may all be different languages. The y-axis of the graph 800 represents numerical values.

Threshold values may be set to be higher in response to a determination that the accuracy of the trained model is lower and vice versa. This behavior fits the sigmoid function after flipping over the y-axis of a linear plot of a first line, e.g., see Model Accuracy, that represents an accuracy of a trained semantic consistency model and a second line, e.g., see Threshold Value, that represents predetermined threshold values. Accordingly, a function expression may be defined and the relatively best parameter may be set by experimenting with historical data. In some approaches, in response to a determination that an accuracy of the trained semantic consistency model has improved, the second predetermined threshold may be optionally dynamically adjusted. Equation (2) described elsewhere herein may serve to define this functional expression.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

training a semantic consistency model with historical data, wherein the training includes tuning hyper-parameters to improve an accuracy of the semantic consistency model;

in response to a determination that a predetermined threshold of accuracy is met during the training, using the trained semantic consistency model to determine a semantic consistency of contents of two screenshots that include images, wherein the trained semantic consistency model bases the semantic consistency on dimensions including: a linguistic comparison of the contents, an image comparison of the contents and a text location comparison of the contents; and outputting the determined semantic consistency for display on a user device.

2. The computer-implemented method of claim 1, comprising: in response to a determination that the semantic consistency model does not have at least the predetermined threshold of accuracy as a result of the training, delaying the use of the semantic consistency model during additional training.

3. The computer-implemented method of claim 1, wherein the linguistic comparison of the contents is determined by a process that includes:

recognizing and extracting text from the two screenshots to determine text segments and text segment area coordinates for the extracted text;

calculating a vector value of each text of the text segments;

calculating a deviation value of vector pairs; and calculating an overall text deviation of the two screenshots.

4. The computer-implemented method of claim 3, wherein the linguistic comparison of the contents is the overall text deviation of the two screenshots.

5. The computer-implemented method of claim 1, wherein the image comparison of the contents is determined by a process that includes:

grouping text in the screenshots by location based on text segment area coordinates;

dividing each of the screenshots into blocks, wherein each of the blocks includes a different one of the text groupings;

removing the text from the screenshots to reduce language noise; and calculating an overall deviation value of the blocks, wherein the image comparison of the contents is the overall deviation value of the blocks.

6. The computer-implemented method of claim 1, wherein the image comparison of the contents is determined by a process that includes:

segmenting the screenshots into blocks;

calculating vector values for each of the blocks;

calculating deviation values for pairs of the vector values, wherein each vector value pair includes a vector value of a block of a first of the screenshots and a vector value of a block of a second of the screenshots; and calculating an overall deviation value of the two screenshots, wherein the image comparison of the contents is the overall deviation value of the two screenshots.

7. The computer-implemented method of claim 1, wherein the text location comparison of the contents is determined by a process that includes:

comparing text segment area coordinates of the two screenshots; and calculating an overall text location deviation of text of the two screenshots based on the text segment area coordinate comparisons, wherein text location comparison of the contents is the overall text location deviation.

8. The computer-implemented method of claim 1, wherein a language of the contents of a first of the screenshots is different than a language of the contents of a second of the screenshots.

9. A computer program product, the computer program product comprising a computer readable storage medium having program instructions embodied therewith, the program instructions readable and/or executable by a computer to cause the computer to:

train, by the computer, a semantic consistency model with historical data, wherein the training includes tuning hyper-parameters to improve an accuracy of the semantic consistency model;

in response to a determination that a predetermined threshold of accuracy is met during the training, use, by the computer, the trained semantic consistency model to determine a semantic consistency of contents of two screenshots that include images, wherein the trained semantic consistency model bases the semantic consistency on dimensions including: a linguistic comparison of the contents, an image comparison of the contents and a text location comparison of the contents; and output, by the computer, the determined semantic consistency for display on a user device.

10. The computer program product of claim 9, the program instructions readable and/or executable by the computer to cause the computer to: in response to a determination that the semantic consistency model does not have at least the predetermined threshold of accuracy as a result of the training delay the use of the semantic consistency model during additional training.

11. The computer program product of claim 9, wherein the linguistic comparison of the contents is determined by a process that includes:

recognizing and extracting text from the two screenshots to determine text segments and text segment area coordinates for the extracted text;

calculating a vector value of each text of the text segments;

calculating a deviation value of vector pairs; and calculating an overall text deviation of the two screenshots.

12. The computer program product of claim 11, wherein the linguistic comparison of the contents is the overall text deviation of the two screenshots.

13. The computer program product of claim 9, wherein the image comparison of the contents is determined by a process that includes:

grouping text in the screenshots by location based on text segment area coordinates;

dividing each of the screenshots into blocks, wherein each of the blocks includes a different one of the text groupings;

removing the text from the screenshots to reduce language noise; and calculating an overall deviation value of the blocks, wherein the image comparison of the contents is the overall deviation value of the blocks.

14. The computer program product of claim 9, wherein the image comparison of the contents is determined by a process that includes:

segmenting the screenshots into blocks;

calculating vector values for each of the blocks;

calculating deviation values for pairs of the vector values, wherein each vector value pair includes a vector value of a block of a first of the screenshots and a vector value of a block of a second of the screenshots; and calculating an overall deviation value of the two screenshots, wherein the image comparison of the contents is the overall deviation value of the two screenshots.

15. The computer program product of claim 9, wherein the text location comparison of the contents is determined by a process that includes:

comparing text segment area coordinates of the two screenshots; and calculating an overall text location deviation of text of the two screenshots based on the text segment area coordinate comparisons, wherein text location comparison of the contents is the overall text location deviation.

16. The computer program product of claim 9, wherein a language of the contents of a first of the screenshots is different than a language of the contents of a second of the screenshots.

17. A system, comprising:

a processor; and logic integrated with the processor, executable by the processor, or integrated with and executable by the processor, the logic being configured to:

train a semantic consistency model with historical data, wherein the training includes tuning hyper-parameters to improve an accuracy of the semantic consistency model;

in response to a determination that a predetermined threshold of accuracy is met during the training, use the trained semantic consistency model to determine a semantic consistency of contents of two screenshots that include images, wherein the trained semantic consistency model bases the semantic consistency on dimensions including: a linguistic comparison of the contents, an image comparison of the contents and a text location comparison of the contents; and output the determined semantic consistency for display on a user device.

\* \* \* \* \*